(12) United States Patent
Rautio

(10) Patent No.: US 10,328,393 B2
(45) Date of Patent: Jun. 25, 2019

(54) MEMBRANE LAMINATE

(75) Inventor: Kevin Rautio, Manchester-by-the-sea, MA (US)

(73) Assignee: EMD Millipore Corporation, Burlington, MA (US)

( * ) Notice: Subject to any disclaimer, the term of this patent is extended or adjusted under 35 U.S.C. 154(b) by 449 days.

(21) Appl. No.: 12/451,467

(22) PCT Filed: May 15, 2008

(86) PCT No.: PCT/US2008/006382
§ 371 (c)(1),
(2), (4) Date: Mar. 4, 2010

(87) PCT Pub. No.: WO2008/144030
PCT Pub. Date: Nov. 27, 2008

(65) Prior Publication Data
US 2010/0181248 A1    Jul. 22, 2010

Related U.S. Application Data

(60) Provisional application No. 60/930,585, filed on May 17, 2007.

(51) Int. Cl.
*B01D 61/14* (2006.01)
*B01D 63/08* (2006.01)
(Continued)

(52) U.S. Cl.
CPC ......... *B01D 65/003* (2013.01); *B01D 61/145* (2013.01); *B01D 63/081* (2013.01); *B01D 63/084* (2013.01); *B01D 63/087* (2013.01); *B01D 69/10* (2013.01); *B01D 69/12* (2013.01); *B01D 71/34* (2013.01); *B01D 71/68* (2013.01); *B29C 65/18* (2013.01); *B29C 66/0042* (2013.01); *B29C 66/1122* (2013.01); *B29C 66/24221* (2013.01); *B29C 66/24244* (2013.01); *B29C 66/30326* (2013.01); *B29C 66/54* (2013.01); *B29C 66/71* (2013.01);
(Continued)

(58) Field of Classification Search
None
See application file for complete search history.

(56) References Cited

U.S. PATENT DOCUMENTS 3,954,625 A * 5/1976 Michalski ............... 210/445
4,824,568 A * 4/1989 Allegrezza et al. ......... 210/490
(Continued)

FOREIGN PATENT DOCUMENTS

CN     1338970 A     3/2002
CN   101730576 A     6/2010
(Continued)

OTHER PUBLICATIONS

International Search Report, PCT/US2008/006382, dated Aug. 7, 2008.
(Continued)

*Primary Examiner* — Krishnan S Menon
(74) *Attorney, Agent, or Firm* — Nields, Lemack & Frame, LLC

(57) ABSTRACT

A laminate is provided comprising at least one polysulfone and/or polyethersulfone porous membrane heat bonded to a polyvinylidene fluoride substrate.

9 Claims, 2 Drawing Sheets

(51) Int. Cl.
- *B01D 65/00* (2006.01)
- *B01D 69/10* (2006.01)
- *B01D 69/12* (2006.01)
- *B01D 71/34* (2006.01)
- *B01D 71/68* (2006.01)
- *B29C 65/00* (2006.01)
- *B29C 65/18* (2006.01)
- *B29K 27/00* (2006.01)
- *B29K 81/00* (2006.01)
- *B29L 22/00* (2006.01)
- *B29L 31/14* (2006.01)
- *B29K 105/00* (2006.01)
- *B29K 105/04* (2006.01)

(52) U.S. Cl.
CPC .......... *B29C 66/712* (2013.01); *B29C 66/727* (2013.01); *B29C 66/919* (2013.01); *B29C 66/91421* (2013.01); *B29C 66/91431* (2013.01); *B29C 66/91933* (2013.01); *B01D 2313/16* (2013.01); *B01D 2323/08* (2013.01); *B29C 66/8122* (2013.01); *B29C 66/929* (2013.01); *B29C 66/9492* (2013.01); *B29K 2027/16* (2013.01); *B29K 2081/06* (2013.01); *B29K 2105/0085* (2013.01); *B29K 2105/0088* (2013.01); *B29K 2105/04* (2013.01); *B29L 2022/00* (2013.01); *B29L 2031/14* (2013.01); *Y10T 156/10* (2015.01)

(56) References Cited

U.S. PATENT DOCUMENTS

| | | | |
|---|---|---|---|
| 4,940,562 | A | 7/1990 | Masaharu et al. |
| 5,426,742 | A | 6/1995 | Kawasaki et al. |
| 7,208,200 | B2 | 4/2007 | Kools |
| 2005/0279695 | A1* | 12/2005 | Straeffer et al. .............. 210/335 |
| 2017/0056830 | A1 | 3/2017 | Rautio |

FOREIGN PATENT DOCUMENTS

| | | |
|---|---|---|
| EP | 0245863 | 11/1987 |
| EP | 1609517 | 12/2005 |
| WO | WO 2006/044712 | 4/2006 |

OTHER PUBLICATIONS

International Preliminary Report on Patentability received for PCT Patent Application No. PCT/US2008/006382, dated Nov. 17, 2009, 8 pages.

Office action dated May 4, 2018 in co-pending U.S. Appl. No. 15/351,538.

Final rejection dated Aug. 29, 2018 in co-pending U.S. Appl. No. 15/351,538.

Notice of allowance dated Feb. 6, 2019 in co-pending U.S. Appl. No. 15/351,538.

* cited by examiner

MEMBRANE LAMINATE

CROSS REFERENCE TO RELATED APPLICATIONS

This application is the U.S. National Stage Application of International Application No.: PCT/US2008/006382, filed on May 15, 2008, which claims priority to U.S. Application No.: 60/930,585, filed May 17, 2007.

FIELD OF THE INVENTION

This invention relates to a membrane structure comprising a polysulfone or polyethersulfone membrane, heat bonded to a PVDF (polyvinylidene fluoride) substrate.

BACKGROUND OF THE INVENTION

At the present time, it is desirable to provide filtration apparatus for removing virus from biological fluids which are presterilized at the site of manufacturing the filtration apparatus and sanitized at the site of using the filtration apparatus. Generally, sterilization at the manufacturing site is effected with gamma radiation and sanitization is effected with caustic at the site of use. Caustic sanitization is effected first with a caustic aqueous solution (typically 0.1 normal sodium hydroxide), then with sterile water followed by sterile buffer. Accordingly, it is necessary that the filtration apparatus be resistant to degradation due to both gamma radiation and caustic.

The filtration apparatus utilizes elements comprising a support plate to which is bonded a filtration membrane generally comprising a polysulfone (PS) membrane or a polyethersulfone (PES) membrane since high performance ultrafiltration (UF) can be effected therewith.

At the present time, it is known that PS or PES membranes can be heat bonded to an acrylic substrate. Since acrylic is not caustic resistant, its use in processes that requires caustic sterilization is undesirable.

PS or PES membrane can be easily thermally bonded to a polysulfone substrate (plate) because of the similarity of the materials. However, it is difficult to bond the plates together. A process typically used to bond plates together is called contact welding. The process involves putting two plastic plates in contact with a heater until the plastic begins to melt. The plates are then removed from the heater, the heater is slid out of the way and the plates are pressed together. This process requires the plastic material to remain molten until the two plates are pressed together so that, when the material cools, the two plates are completely welded. It is difficult to weld a polysulfone or polyethersulfone plate to a plate of the same or similar material using this process. It has been found that melted PS or PES quickly forms a skin when the heating element is removed therefrom which renders formation of a good plate to plate bond difficult.

Other methods of welding PS or PES plates together have been attempted and proven to be difficult or produce some negative effect on the finished product. Some of these methods include laser welding, radio frequency (RF) welding, vibration welding, ultrasonic welding and solvent welding. Laser and RF welding do not produce a sufficiently strong bond. Vibration and ultrasonic welding result in a generation of PS or PES particles that is undesirable. Solvent welding with a solvent like methylene chloride is difficult because the membrane is made of a similar material and can be changed or dissolved by the solvent.

Accordingly, it would be desirable to provide elements of a filtration cartridge which include a membrane heat bonded to a substrate that can be contact welded and have none of the negative effects discussed above. In addition, it would be desirable to provide such elements which are also resistant to degradation by exposure to either gamma radiation or caustic.

SUMMARY OF THE INVENTION

Figure 1:
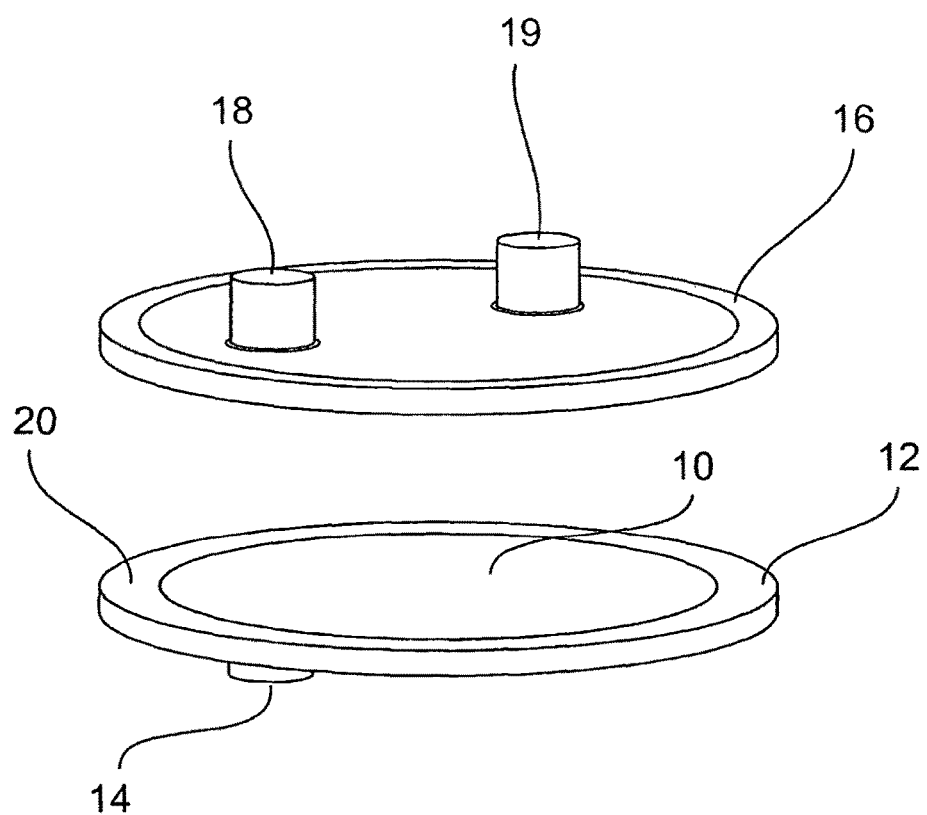
FIG. 1 is an exploded view of a filtration cartridge produced by the present invention.

The present invention provides filtration cartridge elements having a PS or PES membrane heat bonded to a polyvinylidene fluoride (PVDF) substrate. Two or more PVDF substrates are then easily and simply bonded together. Heat bonding is effected by applying a heating element under pressure to a membrane comprising PS or PES or copolymers thereof or blends thereof which, in turn, is in contact with the PVDF substrate in order to partially melt the PVDF substrate to a degree that the molten PVDF infiltrates the PS or PES membrane pores. The heating element is removed and the molten PVDF is cooled to solidify it. The resultant bond of membrane to substrate is sufficiently strong that attempts to remove the membrane from the substrate results in membrane residue remaining bonded to the substrate. Two or more PVDF substrates can then be heat bonded to each other.

DESCRIPTION OF SPECIFIC EMBODIMENTS

In accordance with the present invention, the membrane can have any configuration such as symmetric or asymmetric (skinned or unskinned), or the like. In addition, the membrane can have any porosity such as a reverse osmosis (RO) membrane, ultrafiltration (UF) membrane, microfiltration (MF) membrane, or the like. The PS or PES membranes generally have a melting point between about 428° F. (140° C.) and about 446° F. (230° C.). Such membranes are well known and made by many manufacturers including Millipore Corporation of Billerica, Mass. under tradenames such as Millipore Express® membranes. A preferred membrane is a unitary membrane made by a co-cast process in which the composite membrane is formed from two or more polymeric solutions which are cast upon each other essentially simultaneously. This allows one to create unique membranes such as having two zones of asymmetry or symmetry, a zone of asymmetry with a zone of symmetry and the like. Pore sizes and thickness in each of the zones can also be varied. U.S. Pat. No. 7,208,200 shows one process for making such membranes.

The PVDF substrate to which the PS and/or PES membrane is bonded can be designed to include internal porting for feed, permeate and/or retentate as well as fluid pathways to effect desired fluid flow. PVDF generally has a melting point between about 284° F. (140° C.) and about 356° F. (180° C.). In order to effect bonding of one or more PS and/or PES membranes to a PVDF substrate, a heating element is provided. It is preferred that the portion of the heating element that contacts the membrane is provided with an anti-stick surface such as polytetrafluoroethylene (PTFE) so that the membrane to substrate bond is not adversely affected. The heating element is heated to a temperature of between about 490° F. (254° C.) and about 530° F. (277° C.) and it is applied to the membrane at the desired bond area which overlaps with at least a portion of the PVDF substrate, under pressure to assure intimate contact between the membrane and the substrate. Heating under pressure is effected for a time period sufficient to melt the PVDF at the desired bond area and to permit infiltration of the molten PVDF into the membrane pores. The heating element is then removed from contact with the membrane and the resulting laminate is allowed to cool to permit the molten PVDF to solidify.

A second PVDF substrate which may or may not contain a membrane as desired, is then brought near the first PVDF substrate to which PS or PES membrane has already been sealed as described above. The second substrate may contain one or more ports for feed, permeate and/or retentate, gas venting or the like as desired.

The second substrate is heated with the heating element and then pressed against the surface of the first PVDF substrate containing the membrane to seal the first and second PVDF substrates together.

The following example illustrates the present invention and is not intended to limit the same.

EXAMPLE 1

As shown in FIG. 1, a polyethersulfone UF membrane 10 was bonded to the circular PVDF support plate 12 having a fluid outlet 14. The temperature of the heating element used was 510° F. (265° C.) to 540° F. (282° C.). The sealing time was 4 to 10 seconds at a pressure of 20 to 30 psig. A circular PVDF top plate 16 having a fluid inlet 18 then was heat bonded to the PVDF support plate 12 about the periphery 20 to form a filtration cartridge having a PES membrane 10, a fluid inlet 18 and a fluid outlet 14 where all fluid feed is required to pass through the membrane 10 prior to passing through the outlet 14. Preferably, the top plate 16 is bonded to the support plate 12 outside of the area to which to membrane 10 is bonded to the support plate 12.

The device according to the Example provides an integrally sealed membrane to the support plate and a liquid tight integrally sealed top plate to the bottom plate. The manufacture is simple, quick and easy and avoids the problems of the past while providing a device that is both gamma radiation and caustic stable.

Optionally, as shown another port 19 may also be used on one (as shown) or both plates 12, 16. This may be used for gas venting with an appropriate gas filter attached to it (not shown) such as a MILLEX® gas vent filter available from Millipore Corporation of Billerica, Mass. Alternatively, it can be connected to a conduit (not shown) for the retentate that can then be returned to the supply for recirculation as occurs in tangential flow filtration.

Figure 2:
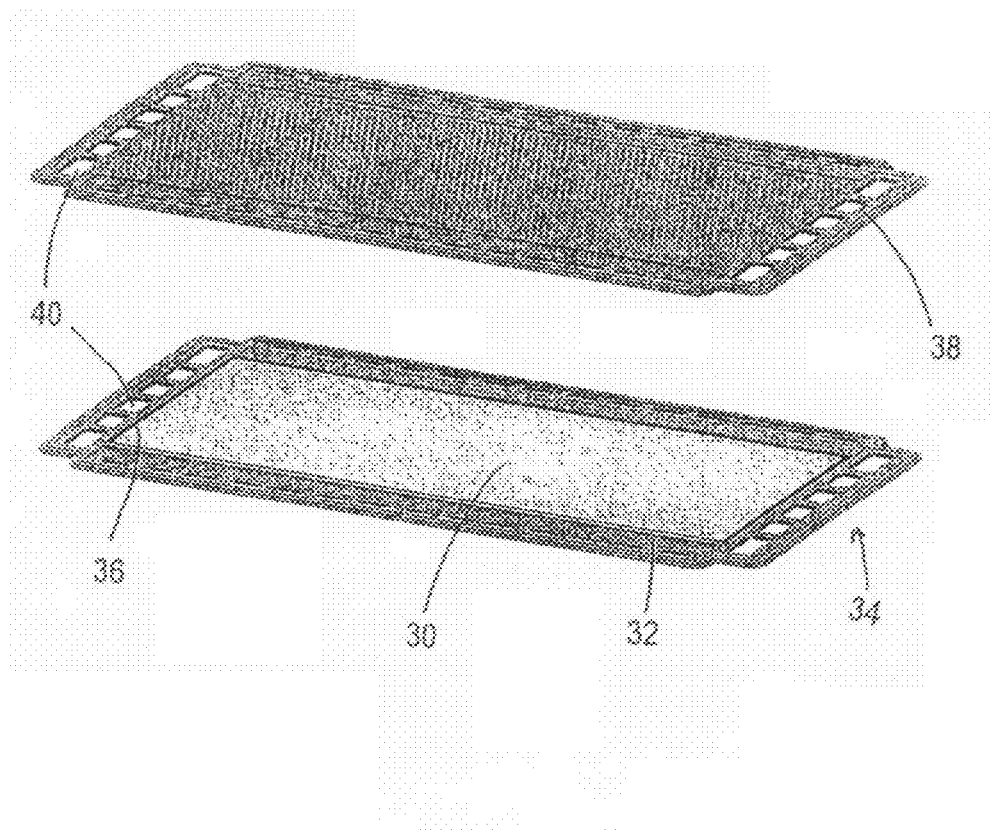
FIG. 2 is an exploded view of a filtration cartridge produced by the present invention.

While FIG. 1 shows the device in a round format, other formats may be used as well. For example, FIG. 2 shows a typical plate and frame design often used in cassette style filter devices. In FIG. 2, the PS or PES membrane 30 is bonded to a surface 32 of a first cassette frame 34 as indicated by sealing line 36. A second cassette frame 38 is then bonded to the first cassette frame 34 outside of the area 36 to which the membrane is attached to the first cassette frame 34. Various ports 40 are shown in the cassette frames 34 and 38. Two or more frames may be used. Multiple cassettes can be stacked upon each other to form a suitably sized device. The cassettes may have a sealed outer surface, at least on the outermost cassette on each end or they may have separate additional solid end plates (not shown) also made of PVDF bonded in a similar fashion to their outer surfaces as are well known in the art.

What is claimed:

1. An ultrafiltration device, comprising:
   a plurality of porous ultrafiltration membranes, wherein the plurality of porous ultrafiltration membranes is made of a polymeric material selected from the group consisting of polysulfone, polyethersulfone, blends thereof and/or copolymers thereof;
   a first support plate and a second support plate, each of the first support plate and the second support plate formed of polyvinylidene fluoride, the first and second support plates each having a first surface facing each other and a second surface opposite the first surface of each support plate;
   wherein the plurality of porous ultrafiltration membranes are heat bonded to the first surface of said first support plate along a sealing line such that molten polyvinylidene fluoride infiltrates into pores of the porous ultrafiltration membranes and, optionally, wherein at least one second support plate comprises a porous ultrafiltration membrane;
   a thermal bond between the first support plate and the second support plate, wherein the thermal bond forms a liquid tight seal outside the sealing line on each first support plate, wherein the number of porous ultrafiltration membranes is in a number equal to the number of the first support plates; and
   at least one port, the at least one port formed from the first surface to the second surface of each the first support plate and the second support plate.

2. The ultrafiltration device of claim 1, further comprising a composite membrane having at least one zone of asymmetry and at least one zone of symmetry.

3. The ultrafiltration device of claim 1, having a first end and a second end, said device comprising a first outermost cassette on said first end of the ultrafiltration device, a second outermost cassette on said second end of the ultrafiltration device and two or more cassette frames disposed between.

4. The ultrafiltration device of claim 1, wherein the first and second support plates are bonded to each other around the periphery of each.

5. The ultrafiltration device of claim 1, wherein the first support plate has at least one additional port formed from the first surface through to the second surface of the first support plate.

6. The ultrafiltration device of claim 1, wherein both the first support plate and the second support plate have at least one additional port formed from the first surface through to the second surface of each support plate.

7. The ultrafiltration device of claim 1, wherein the first support plate has at least one additional port formed from the first surface through to the second surface of the first support plate and wherein that at least one additional port forms a vent.

8. The ultrafiltration device of claim 1, further comprising a series of two or more additional first and second support plates with a membrane bonded to the first surface of each additional first support plate along a sealing line, each series of additional support plates being heat bonded to each other and adjacent second surfaces of the adjoining set of support plates outside of the sealing line.

9. The ultrafiltration device of claim 1, further comprising a series of two or more additional first and second support plates with a membrane bonded to the first surface of each additional first support plate along a sealing line, each series of additional support plates being heat bonded to each other and adjacent second surfaces of the adjoining set of support plates outside of the sealing line and a first end plate bonded to the outermost second surface of the first support plate and a second end plate bonded to the outermost surface of the second support plate in the series to form the liquid tight outer seal between adjacent plates.

* * * * *